(12) United States Patent
Gebara et al.

(10) Patent No.: US 8,539,185 B2
(45) Date of Patent: Sep. 17, 2013

(54) SYSTOLIC NETWORKS FOR A SPIRAL CACHE

(75) Inventors: Fadi H. Gebara, Austin, TX (US);
Jeremy D. Schaub, Austin, TX (US);
Volker Strumpen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 12/640,348

(22) Filed: Dec. 17, 2009

(65) Prior Publication Data

US 2010/0122012 A1    May 13, 2010

Related U.S. Application Data

(63) Continuation-in-part of application No. 12/270,132, filed on Nov. 13, 2008.

(51) Int. Cl.
*G06F 12/00* (2006.01)
*G06F 13/00* (2006.01)
*G06F 13/28* (2006.01)

(52) U.S. Cl.
USPC .............................. 711/165; 711/3; 711/118

(58) Field of Classification Search
USPC ..................................................... 711/3, 165
See application file for complete search history.

(56) References Cited

U.S. PATENT DOCUMENTS

| | | | |
|---|---|---|---|
| 5,355,345 A | 10/1994 | Dickinson et al. | |
| 6,763,426 B1 * | 7/2004 | James et al. | 711/108 |
| 6,996,117 B2 | 2/2006 | Lee et al. | |
| 7,107,399 B2 | 9/2006 | Bilardi et al. | |
| 7,461,210 B1 | 12/2008 | Wentzlaff et al. | |
| 7,805,575 B1 | 9/2010 | Agarwal et al. | |
| 2002/0083266 A1 | 6/2002 | Reuter | |
| 2002/0116579 A1 | 8/2002 | Goodhue et al. | |
| 2002/0188781 A1 * | 12/2002 | Schoch et al. | 710/107 |
| 2003/0074505 A1 * | 4/2003 | Andreas et al. | 710/110 |
| 2003/0128702 A1 * | 7/2003 | Satoh et al. | 370/390 |
| 2003/0145239 A1 | 7/2003 | Kever et al. | |
| 2003/0236961 A1 | 12/2003 | Qiu et al. | |
| 2004/0148482 A1 * | 7/2004 | Grundy et al. | 711/167 |

(Continued)

OTHER PUBLICATIONS

Defintion of "systole"; Retrieved from http://www.merriam-webster.com/dictionary/systolic on Aug. 23, 2012.*

(Continued)

*Primary Examiner* — Christian P Chace
*Assistant Examiner* — Prasith Thammavong
(74) *Attorney, Agent, or Firm* — Mitch Harris, Atty at Law, LLC; Andrew M. Harris; Eustus D. Nelson

(57) ABSTRACT

Systolic networks within a tiled storage array provide for movement of requested values to a front-most tile, while making space for the requested values at the front-most tile by moving other values away. A first and second information pathway provide different linear pathways through the tiles. The movement of other values, requests for values and responses to requests is controlled according to a clocking logic that governs the movement on the first and second information pathways according to a systolic duty cycle. The first information pathway may be a move-to-front network of a spiral cache, crossing the spiral push-back network which forms the push-back network. The systolic duty cycle may be a three-phase duty cycle, or a two-phase duty cycle may be provided if the storage tiles support a push-back swap operation.

23 Claims, 6 Drawing Sheets

(56) References Cited

U.S. PATENT DOCUMENTS

| | | |
|---|---|---|
| 2005/0114618 A1 | 5/2005 | Lu et al. |
| 2005/0125702 A1 | 6/2005 | Huang et al. |
| 2005/0132140 A1 | 6/2005 | Burger et al. |
| 2005/0160132 A1 | 7/2005 | Van Doren et al. |
| 2006/0143384 A1 | 6/2006 | Hughes et al. |
| 2006/0212654 A1 | 9/2006 | Balakrishnan |
| 2007/0022309 A1 | 1/2007 | Adamo et al. |
| 2009/0178052 A1 | 7/2009 | Shen et al. |
| 2010/0064108 A1 | 3/2010 | Harris et al. |
| 2010/0122031 A1* | 5/2010 | Strumpen et al. ............. 711/122 |

OTHER PUBLICATIONS

Bilardi et al., "Optimal Organizations for Pipelined Hierarchical Memories", SPAA '02, Aug. 2002, p. 109-116, Winnipeg, Manitoba, Canada.

Kwon et al., "A Scalable Memory System Design", $10^{th}$ International Conference on VLSI Design, Jan. 1997, p. 257-260.

Kim et al., "An Adaptive, Non-Uniform Cache Structure for Wire-Delay Dominated On-Chip Caches", ASPLOS X, Oct. 2002, p. 211-222, San Jose, CA.

Baer et al., "On the Inclusion Properties for Multi-Level Cache Hierarchies", IEEE, Feb. 1988, p. 73-80.

Dickinson et al., "A Systolic Architecture for High Speed Pipelined Memories", IEEE, 1993, p. 406-409.

Beckmann et al., "Managing Wire Delay in Large Chip-Multiprocessor Caches", 37th Annual IEEE/ACM International Symposium on Microarchitecture, Dec. 2004, p. 319-330, Portland, OR.

Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.

Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.

Foglia et al, "A NUCA Model for Embedded Systems Cache Design", 3rd IEEE Workshop on Embedded Systems for Real-Time Multimedia, Sep. 2005, p. 41-46, New York, NY.

Huh et al., "A NUCA Substrate for Flexible CMP Cache Sharing", International Conference on Supercomputing, Jun. 2005, p. 31-40, Boston, MA.

U.S. Appl. No. 12/270,095, filed Nov. 13, 2008, Strumpen, et al.
U.S. Appl. No. 12/270,132, filed Nov. 13, 2008, Strumpen, et al.
U.S. Appl. No. 12/270,186, filed Nov. 13, 2008, Strumpen, et al.
U.S. Appl. No. 12/270,249, filed Nov. 13, 2008, Strumpen, et al.
U.S. Appl. No. 12/264,682, filed Nov. 4, 2008, Li et al.

Abella et al., "Power Efficient Data Cache Designs", IEEE Computer Society, Oct. 2003, p. 3-8, San Jose, CA.

Gilbert et al., "Variable-Based Multi-Modual Data Caches for Clustered VLIW Processors", IEEE Computer Society, Sep. 2005, p. 3-13, St. Louis, MO.

Gonzales et al., "A Data Cache with Multiple Caching Strategies Tuned to Different Types of Locality", ACM, 1995, p. 338-347.

Lee et al., "Region-Based Caching: An Energy Delay Efficient Memory Architecture for Embedded Processors", CASES, 2000, p. 120-127.

Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.

Matteo Frigo. The Weakest Reasonable Memory Model. Master's thesis, Department of Electrical Engineering and Computer Science, Massachsetts Institute of Technology, 1998.

Blumofe, et al., "Dag-Consistent Distributed Shared Memory", Proceedings of the 10th International Parallel Processing Symposium (IPPS), pp. 132-141, Honolulu, Hawaii, 1996.

Molnar, et al., "Counterflow Pipeline Processor Architecture", Technical report, SMLI TR-94-25, Sun Microsystems Laboratories, Inc., 1994.

Akioka, et al., "Ring data location prediction scheme for Non-Uniform Cache Architectures," *International Conference on Computer Design*, Piscataway 2008.

Jin, et al., "A Domain-Specific On-Chip Network Design for Large Scale Cache Systems," *13th International Symposium on High-Performance Computer Architecture (HPCA-13)*, Phoenix, 2007.

Definition of "systole"; Retrieved from http://www.merriam-webster.com/dictionary/systolic on May 10, 2012.

Office Action in U.S. Appl. No. 12/270,132 mailed on May 23, 2012.
Office Action in U.S. Appl. No. 13/419,143 mailed on Jun. 21, 2012.
Office Action in U.S. Appl. No. 12/640,451 mailed on Jul. 24, 2012.

* cited by examiner

SYSTOLIC NETWORKS FOR A SPIRAL CACHE

The present Application is a Continuation-in-Part of U.S. Patent Application entitled "TILED STORAGE ARRAY WITH SYSTOLIC MOVE-TO-FRONT ORGANIZATION" Ser. No. 12/270,132 filed on Nov. 13, 2008, having at least one common inventor and which is assigned to the same Assignee. The disclosure of the above-referenced U.S. Patent Application is incorporated herein by reference.

BACKGROUND OF THE INVENTION

1. Field of the Invention

The present invention is related to cache memories, and more particularly to systolic network circuit topologies and methods of propagating requests and data within a cache memory having a spiral organization.

2. Description of Related Art

A spiral cache memory as described in the above-incorporated parent U.S. Patent application provides a move-to-front (M2F) network via which values are moved to a front-most storage tile, where the access time at an interface to a processor or a lower-order level of a memory hierarchy are shorter than an average value of access times for all of the tiles in the spiral, and a push-back network that moves values backwards to make room for new values moved, at their time of access, to the front-most storage tile. The push-back and M2F networks also couple the spiral cache to a backing store, so that requests that miss in the spiral cache can be loaded into the front-most tile of the spiral cache via the M2F network and values for which no more storage is available can be ejected to the backing store via the push-back network. As described in the above-incorporated parent U.S. Patent Application, the M2F and push-back networks operate according to a systolic pulse, which can be used advantageously to pipeline requests and data while not requiring buffering within the spiral cache itself.

Therefore, it would be desirable to provide an efficient network topology and methodology for providing systolic networks within a spiral cache.

BRIEF SUMMARY OF THE INVENTION

The invention is embodied in a tiled storage array and method of operation. The tile array has multiple storage locations for storing values, each of which may be a smaller cache memory such as a direct-mapped cache or an associative cache. The tiles are interconnected by a first information pathway and a second information pathway.

The first information pathway moves requests for values and responses containing the values between neighboring tiles to form a first set of ordered collision free paths for propagation of the retrieved values and requests. The requests and responses contain addresses uniquely identifying the requested values and the returned values, which may be cache lines. The first information pathway may be a pure move-to-front (M2F) network that moves each requested value to a front-most one of the tiles.

The second information pathway moves other values between neighboring tiles to form a second linear ordered path for propagation of the other values. The second information pathway may be a push-back swap network that swaps the other values backward to make space for values retrieved by the first information pathway. The other values are also provided with addresses uniquely identifying the values. The first and second information pathways are separate information pathways that connect a front-most one of the multiple storage tiles to the other storage tiles in a different order. The first and second information pathways are operated by a clocking control logic that clocking the movement of the requests, responses and other values between the storage tiles according to patterns and systolic cycles of the first and second information pathways.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention encompasses techniques for communicating values between storage tiles in a tiled storage device, which may be a spiral cache memory. A move-to-front (M2F) network and a push-back network of the spiral cache exemplify a dual information pathway network design, in which requests for values, other commands and returned values (responses) are propagated along the first information pathway and a second information pathway moves other values such as push-back values of the spiral cache that are moved to make room for values moved to the front-most tile by the M2F network. Both information pathways are operated by clocking control logic that operates to provide a systolic pulse by which the requests, responses, commands and other values are moved between next-neighbor tiles.

Spiral Cache

Figure 1:
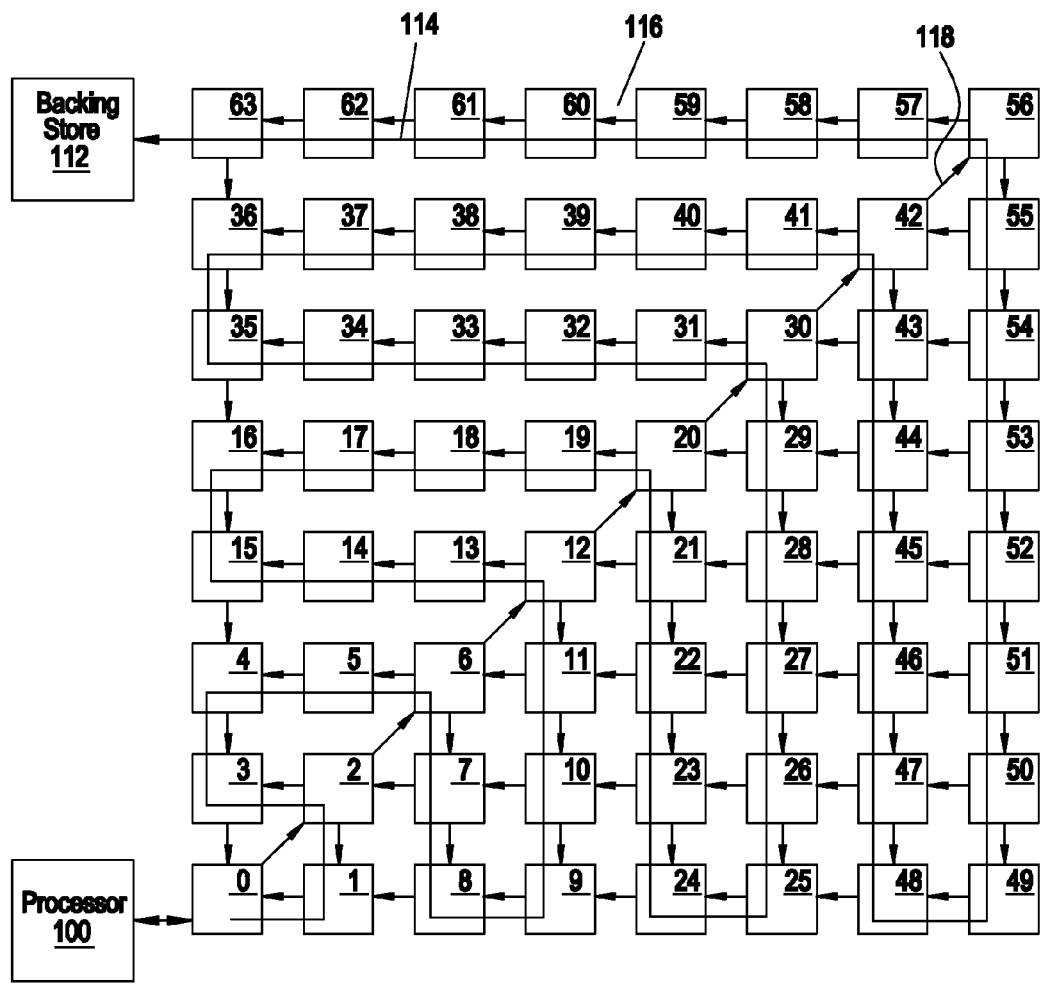
FIG. 1 is a block diagram of a spiral cache according to an embodiment of the present invention.

Referring now to FIG. 1, a hierarchical system including a spiral cache is illustrated, in accordance with an embodiment of the present invention. The illustrated spiral cache is composed of tiles 0-63 and resembles a single quadrant of the spiral caches disclosed in the above-incorporated parent U.S.

Patent Application "TILED STORAGE ARRAY WITH SYSTOLIC MOVE-TO-FRONT ORGANIZATION." The illustrated spiral cache includes two systolic networks, a push-back (spiral) network 114 and a M2F network 116. Push-back network 114 imposes a linear structure on the tiles and begins at front-most tile 0 and at a back-most tile 63 to a backing store 112. Each of tiles 0-63 contains a fast cache memory, such as a direct-mapped cache, and the unit of data transfer across the networks in such a configuration is a cache line. The move-to-front heuristic places cache lines into tiles. A processor 100 issues load or store operations to front-most tile 0. Independent of the particular operation being performed on a value, the spiral cache fetches the corresponding cache line and places it in front-most tile 0. For load operations, the desired data are also sent to processor 100. For store operations, the cache line is patched with the store data before writing the cache line into the cache of tile 0. If the corresponding cache line storage of tile 0 is occupied, the line currently stored in the corresponding location is pushed back to empty the cache ling storage to accept the new line. The push-back operation effectively swaps values (e.g., cache lines) back at each tile along push-back network 114. Data being pushed back travel along push-back network 114 from front-most tile 0 towards the tail end of the spiral, until an empty line is located, or until the data is pushed out of the spiral cache into backing store 112.

FIG. 1 illustrates the tiled organization of a 1-quadrant spiral cache, and while the cache type is still referred to as "spiral", since the front-most tile is not located near the center of the array, the push-back network follows a meandering path that zig-zags in segments of increasing length. Push back network 114 and M2F network 116 are systolic networks, via which data travel in globally synchronized phases across next-neighbor links from tile to tile. In general, a systolic design, in architectures where it may be employed, delivers superior performance compared to a routed network architecture. The spiral cache uses a M2F heuristic to place data in tiles. The role of push-back network 114 is to make space for a new datum when M2F network 116 moves the new datum to front-most tile 0. Assuming that each of tiles 0-63 contains a direct-mapped cache, the unit of transfer is a cache line. Thus, when a cache line is moved to front-most tile 0, a currently stored cache line is pushed back to tile 1 before the new line can be stored in its place in tile 0. M2F network 116 network handles communication of an address associated with load or store operations generated by processor 100 to tiles 0-63 of the spiral cache, and moves the data, if found, to tile 0, where it is stored for use by processor 100. For clarity of the illustrations below, the following assumptions are applied:

1. The illustrated spiral cache is a globally synchronous design.
2. Illustrations are made using an exemplary a 1-quadrant spiral cache
3. Each tile includes a direct-mapped cache, and the unit of transfer across the networks is a cache line.
4. Each of the tile caches performs a read and a write operation. While the illustrated tiles perform a read and a write operation to accomplish a swap, if a unitary swap operation is provided, the duty cycle discussed below can be reduced to shrink the duty cycle from 3 clock cycles to 2 clock cycles.
5. The geometric retry described in the above-incorporated parent U.S. Patent Application "TILED STORAGE ARRAY WITH SYSTOLIC MOVE-TO-FRONT ORGANIZATION" is not described in the examples following, but is supported by the systolic networks described herein.

Figure 6:
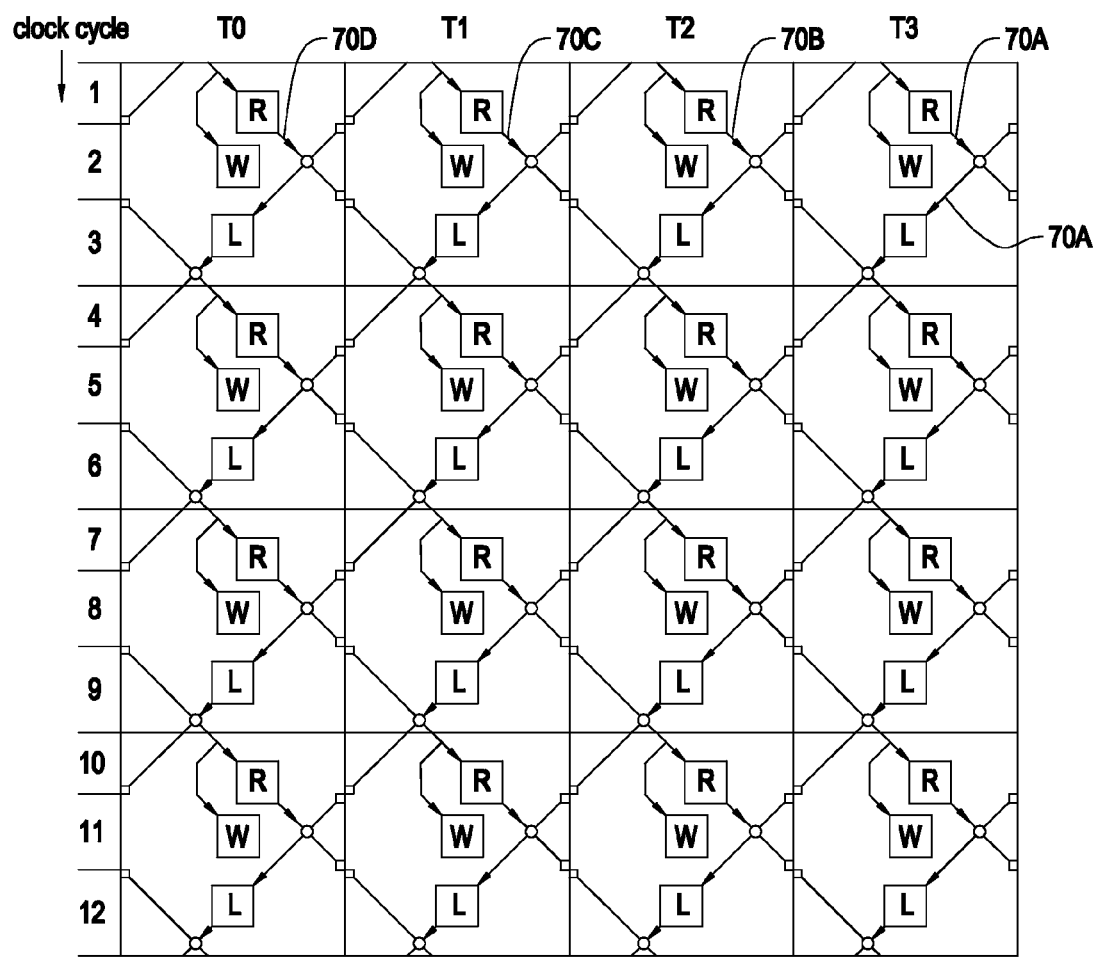
FIG. 6 is a network diagram illustrating data flow over multiple cycles and for multiple tiles within the spiral cache of FIG. 1.

The systolic design of the spiral cache is described in the above-referenced application "TILED STORAGE ARRAY WITH SYSTOLIC MOVE-TO-FRONT ORGANIZATION", which in FIG. 6 of that application, micro-pipelining of the cache accesses and communications via push-back and move-to-front networks is illustrated assuming that the tiles support a swap operation. In the present application, operation in absence of a swap operation is illustrated. Thus, the swap operation is replaced by a read of the cache to retrieve the current line at the address associated with the input signal from push-back network 114, and a subsequent write of the received data. To distinguish the read operation associated with an incoming signal on the M2F network 114, a "lookup operation" is provided. In the description below, the three cache access types: read, write, and lookup require one clock cycle each, for a total of 3 clock cycles per duty cycle.

Figure 2:
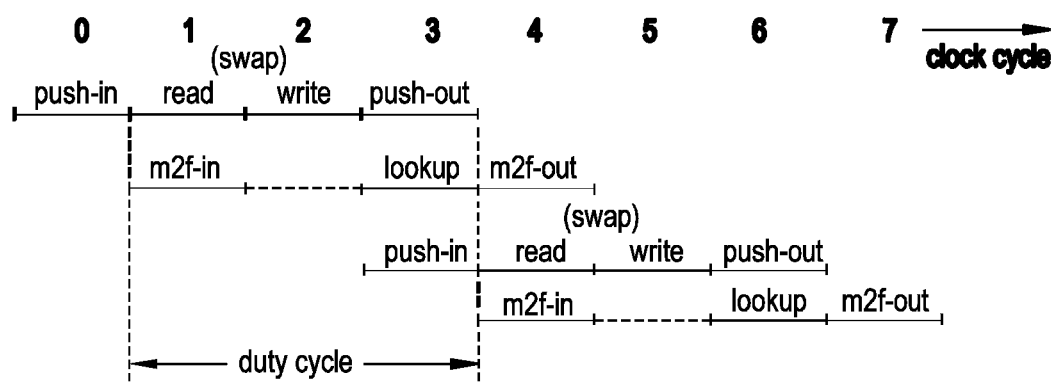
FIG. 2 is a timing diagram illustrating cache micro-operations within the spiral cache of FIG. 1.

Referring now to FIG. 2 micro-pipelining within tiles 0-63 of FIG. 1 is illustrated. In order to perform the above-described read, write and lookup operations, the move-to-front and push-back accesses within tiles 0-63 must be scheduled. Since the systolic design of the spiral cache of FIG. 1 permits one move-to-front lookup operation and one push-back operation per systolic cycle, in a spiral cache in accordance with one embodiment of the present invention, a micro-pipeline with a duty cycle consisting of three clock cycles is included. During clock cycle 0, propagation of push-in data on push-back network 114 from the previous systolic duty cycle is shown. During clock cycle 1, of the illustrated duty cycle a read operation is performed for obtaining the next push-back value in support of push-back network 114. At the end of the same clock cycle 1, a request is received on the M2F network 116, which may be a request for a value or a response containing a value. During clock cycle 2, the received push-in value is stored in the tile's cache. During clock cycle 3, the push-out value read in clock cycle 1 is propagated on push-back network 114, effecting completion of the push-back swap. Also during clock cycle 3, the lookup operation is performed. The M2F-in request received during clock cycle 1 either contains valid M2F data or is invalid. If there is valid data in the M2F request, then the request is merely forwarded. If the data is invalid, address comparison occurs at the tile, as described in further detail below. The lookup operation of clock cycle 3 is also performed if the data are invalid. Performing the lookup after the write enables a determination of whether the push-in value written by the write operation in clock cycle 2 will satisfy the request received on M2F network 116 during clock cycle 1.

Therefore, in the systolic duty cycle illustrated in FIG. 2, the push-back swap is completed and two address comparisons are made for M2F requests that have not been satisfied: a comparison with the data already stored in the tile cache, and a comparison with the push-in data entering the tile during the same duty cycle. Proper operation of the spiral cache requires that only one copy of each cache line may be stored within the spiral cache. Either the cache line is stored in exactly one location inside the spiral cache, or the cache line is not stored in the spiral cache at all. In either case, the value will be present in backing store 112. The location of the value can be any stateful portion of the design, including the caches within tiles 0-63 and within the networks, i.e. the values may be in transit. Due to the significance of the requirement, the property that at most one copy of a cache line may be stored in the spiral cache is referred to as the "single-copy invariant" condition. Problems arise within the spiral cache if the single-copy invariant is violated. For example, assume a cache line is transferred along push-back network 114. If, concurrently, a request were transmitted via M2F network 116, the request and push-back signals would pass each other, since both signals are in transit on separate information pathways. When the M2F request returns to processor 100, it would report a cache miss. Therefore, processor 100 will observe that the requested cache line is not stored in the spiral cache, and loads a new, perhaps outdated copy from backing store 112. Incorrect program behavior results; for example, if processor 100 had issued a store followed by a load to the same cache line, and a copy of the cache line associated with the store operation is being pushed back on push-back network 114 while the copy of the cache line requested by the load operation is moving to the front on M2F network 116. Processor 100 would load a second copy of the cache line, and subsequent requests would be ambiguous due to the duplicate. Finally, the second copy retrieved from backing store 112 is outdated, because it has not been modified by the store operation and appears to be valid. Therefore, in the example, the load operation would return an incorrect value to processor 100. Therefore, the design of the systolic networks and the tile controller as described below will guarantee that requests propagating on the M2F network 116 do not miss counterflowing data moving on push-back network 116.

Network Architecture

Figure 3:
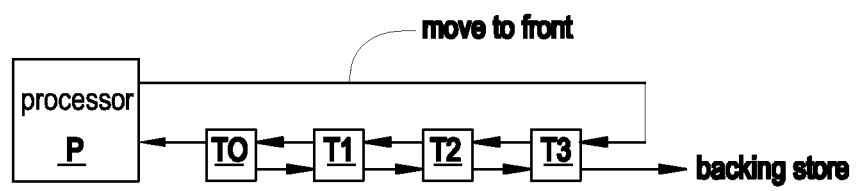
FIG. 3 is a pictorial diagram illustrating a simplified flow of information within the spiral cache of FIG. 1.

Referring now to FIG. 3 a simplified network architecture of an exemplary spiral cache is illustrated. A processor P sends a request out to tile T3 at the tail-end of the spiral cache, at which point the request moves back to front-most tile T0. Tile T0 pushes back data in the opposite direction towards the tail-end tile T3, and potentially into a backing store. The simplified network architecture depicted in FIG. 3 illustrates that, from the perspective of a tile, the push-back network and the move-to-front network in FIG. 3 form a counterflow pipeline. In the description below, an embodiment of tile data flow and the relationship of the tiles with M2F network 116 and push-back network 114 will be provided in detail.

Network Design in 1D Spiral Cache

Figure 4:
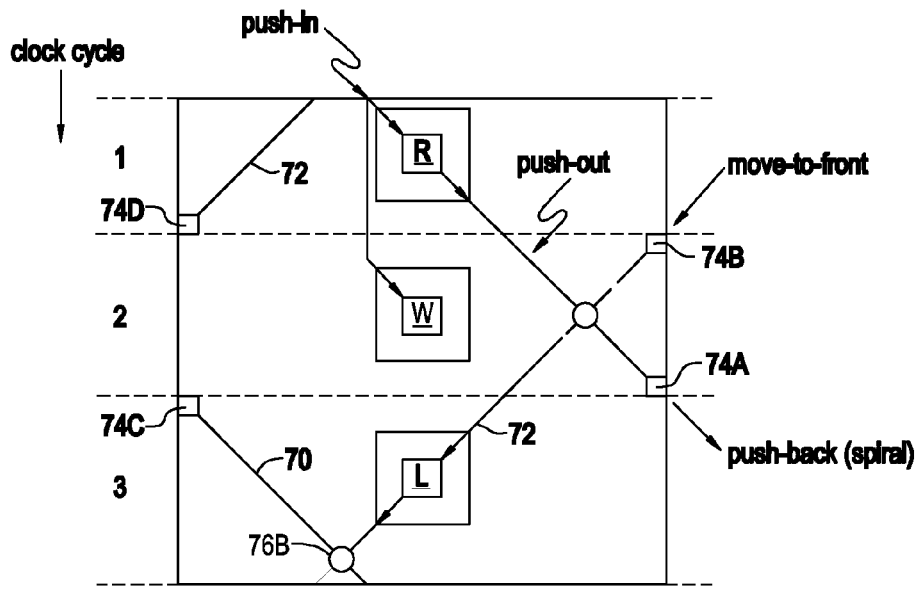
FIG. 4 is a network diagram illustrating data flow through a tile within the spiral cache of FIG. 1.

Referring now to FIG. 4, a network diagram illustrating dataflow within the spiral cache of FIG. 1 is shown. The dataflow depicted in FIG. 4 preserves the single-copy invariant condition while implementing the micro-pipeline illustrated in FIG. 2. In FIG. 4, clock cycles are drawn from top to bottom. Each clock cycle is marked with a letter indicating a corresponding cache access type: R indicating a read operation, W indicating a write operation, and L indicating a lookup operation. The read and write operations implement the push-back swap operation in support of push-back network 114. The lines extending in diagonal directions in FIG. 4 represent dataflows. Push-back communications dataflow 70 traverse the diagram from top left to bottom right, and move-to-front communications dataflow 72 traverse from top right to bottom left. The vertical lines of FIG. 4 represent tile boundaries. Communications 74A-74D between tiles are shown along dataflow 72 of M2F network 116 and dataflow 70 of push-back network 114. Dataflow in FIG. 4 can be interpreted by reference to FIG. 2. During clock cycle 1 of FIG. 2, a mapping portion of the address in the push-in signal is used to read the tile cache to determine if a valid entry is occupying the cache line to which the push-in request maps. If the address maps to a valid entry, the read data becomes push-out data, which is prepared in clock cycle 2 for push-out in clock cycle 3. During clock cycle 2, the push-in data is written into the tile cache. Finally, during clock cycle 3, if the M2F request does not yet contain valid data, i.e., if the request has not yet been satisfied, a lookup operation is performed to determine whether the tile contains the requested value.

According to the 3-clock cycle micro-pipeline illustrated in FIG. 2, push-back data are communicated during clock cycle 3 of the systolic duty cycle. In FIG. 4, communication 74A symbolizes transmission of the push-out data to the neighboring tile in clock cycle 2, and communication 74C depicts receipt of the push-in data during clock cycle 3. Also according to FIG. 2 the M2F data are received from a neighbor tile during clock cycle 1 of the duty cycle. In FIG. 4 communication 74D depicts transmission of the M2F data to the neighboring tile, and communication 74B depicts receipt of the M2F data at the beginning of clock cycle 2. The intersections of push-back dataflow 70 and M2F dataflow 72 indicate locations at which a M2F signal counterflows a push-back signal. In order to preserve the single-copy invariant condition, if a request address traveling on M2F network 116 matches the address of another value traveling on push-back network 114, the push-back value must be "turned around" and moved to front-most tile 0. The circles in FIG. 4 symbolize comparison operations and comparators 76A and 76B that implement the detection and "turning" of push-back values via control logic located within tiles 0-63.

Figure 5A:
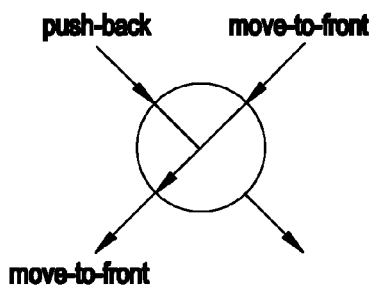
FIGS. 5A and 5B are network diagrams illustrating data flow control via address comparison at a tile within the spiral cache of FIG. 1.
Figure 5B:
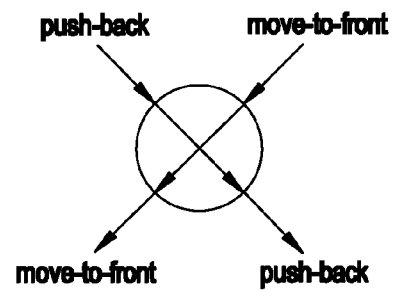

FIGS. 5A and 5B illustrate the two switch positions of xy-comparators 76A, 76B that determines the flow of requests and values at a tile. xy-comparator 76A, 76B compare the addresses of the push-back input and M2F input of the tile. If the addresses match, control logic associated with the comparator redirects the push-back data onto the M2F output of the tile, and deactivates the push-back output of the tile, as illustrated in FIG. 5A. Otherwise, if the addresses do not match, the push-back and move-to-front signals are passed unchanged to their outputs, as illustrated in FIG. 5B. In clock cycle 2 of FIG. 4, the xy-comparator compares an address of an incoming M2F request with the address of the push-out signal generated from the push-in signal received during the preceding duty cycle, which contains any value that was previously stored in the location that maps to the push-in value. xy-comparator 76B in clock cycle 3 compares the address of the M2F request with the push-in signal received at the beginning of the clock cycle. To observe the single-copy invariant, however, the move-to-front signal must be compared to the push-in signal from the preceding duty cycle as well. The communication pattern in FIGS. 2 and 4 is designed to perform this comparison without an additional xy-comparator, but implicitly through the tile cache. Since the push-in is written into the tile cache during clock cycle 2, and the M2F lookup occurs in the subsequent clock cycle 3, if the addresses of the push-in of the preceding duty cycle and the M2F request match, the lookup operation will retrieve the associated data from the tile cache.

Referring now to FIG. 6, dataflow through counterflow pipelines of push-back and move-to-front networks as exemplified in FIG. 3, is illustrated. FIG. 6 replicates the single tile diagram of FIG. 4 to include four tiles and four duty cycles. In the depicted example, as an illustration, a M2F request enters tile T3 during duty cycle 1. More precisely, according to the depicted micro-pipelined organization, the M2F request is received on the M2F network in tile T3 at the beginning of clock cycle 2 (top right connector) entering data flow 72. If there is no push-back activity on dataflow 70A, the M2F request will cause a lookup operation during clock cycle 3 in the cache of tile T3. The result of the lookup operation is communicated during clock cycle 4 to tile T2. If the lookup in T3 was unsuccessful, a lookup is performed in tile T2 during clock cycle 6, and so on until the request arrives at front-most tile T0. To further illustrate that dataflow in the depicted counterflow pipeline preserves the single-copy invariant condition, three different examples including a push-back transaction will be illustrated below.

In the first example, a M2F request traverses the tiles as described above, and tile T0 further generates a push-out value having an address matching that of the M2F request during clock cycle 4, i.e. the M2F request is a request for the value pushed out by tile T0 during clock cycle 4. To preserve the single-copy invariant condition, the push-out must contain be the only copy of the push-out value in the spiral cache, i.e., the address of the push-out must be unique within the spiral cache. The push-out value and the M2F request intersect at tile T1 in clock cycle 8. According to the single-copy invariant condition, the M2F signal received by tile T1 at the beginning of clock cycle 8 must contain invalid data. There are two conditions possible at the input of the xy-comparator in tile T1 in clock cycle 8, depending on whether the push-in generates a push-out during cycle 7. If there is no push-out generated during cycle 7, the xy-comparator passes the M2F request on to perform a lookup operation during clock cycle 9. The lookup operation must produce a hit, because the push-in value is the push-out value from tile T0. If there is a push-out value, the push-out value must be have a conflicting mapping portion of the address, but a different complete address than the address of the push-in value. Therefore, the xy-comparison will detect a mismatch, and pass both the M2F request and the push-out value through. Then, as in the condition in which a push-out was not generated, the lookup operation hits during clock cycle 9. In the subsequent clock cycle, the M2F signal will carry the data to front-most tile T0.

In the second example, tile T1 generates a push-out at dataflow 70B having an address that matches the same M2F request provided in the first example during clock cycle 4, rather than tile T0 generating the push-out. The push-out and the M2F request meet during clock cycle 6 at the xy-comparator in tile T2. Due to the single-copy invariant, the request must contain an invalid value, and the xy-comparator turns the push-back towards the front, since the M2F request is a request for the push-out value.

As a third example, tile T2 generates a push-back value at dataflow 70C having an address matching an M2F request received during clock cycle 4. The push-back value meets the M2F request at the xy-comparator of tile T2 during clock cycle 5. The xy-comparator turns the push-back value toward front-most tile T0, by directing the push-back value onto dataflow 72. On its way towards tile 0, the M2F value is valid, and no lookups are performed on the M2F network 116 from tiles T2-T0. The three examples given above cover all relevant combinations of intersections between matching push-back values and M2F requests/responses. A similar push-back dataflow 70D is illustrated for tile T3

Network Design of a 2D Spiral Cache

The counterflow pipeline described above assumes that push-back values and move-to-front requests intersect in each tile, which is apparent in the simplified spiral cache illustrated in FIG. 3. However, the counterflow pipeline is not as readily apparent in the two-dimensional (2D) spiral cache depicted in FIG. 1. For example, in the spiral cache of FIG. 1, the push-back spiral network 114 counterflows the M2F network 116 in tiles 16-20, but appears to uniflow M2F network 116 (flow in parallel) in tiles 30-35. For tiles at which the direction of the spiral push-back network 116 changes, such as at tile 8 and tile 9, the direction of flow is even less apparent. However, the geometry of the tile array within the spiral cache of FIG. 1, and the order of the tiles does not reflect the topology of the M2F network 116 and push-back network 114, because the tiles are connected such that M2F network 116 counterflows push-back network 114 everywhere.

Figures 7A, 7B:
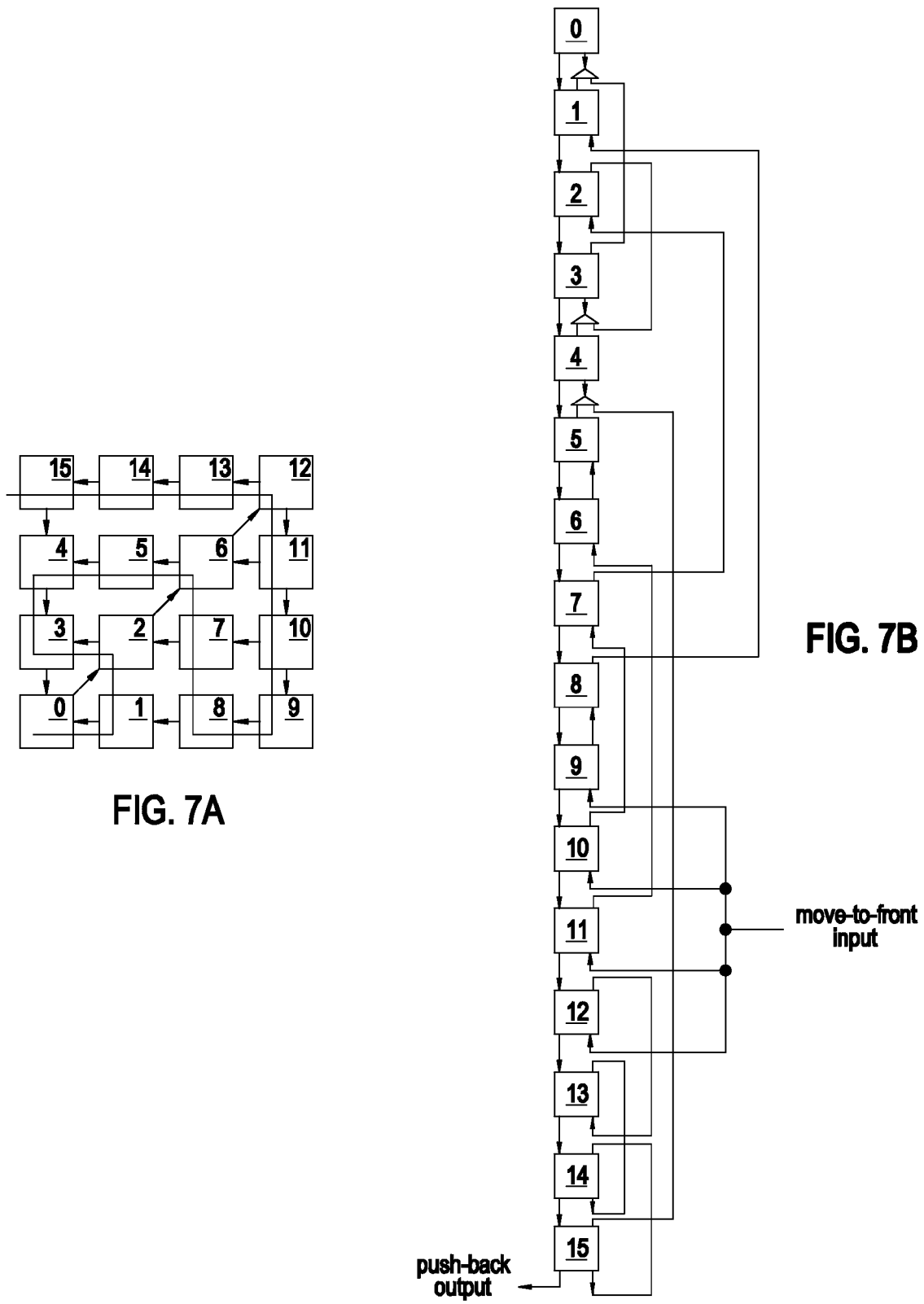
FIG. 7A is a block diagram of a spiral cache following a physical layout order and FIG. 7B is a block diagram of the spiral cache of FIG. 7A illustrating an unwrapped logical connection order.

Referring to FIGS. 7A-7B, the physical layout of a one-quadrant spiral cache in FIG. 7A, while the network topology is illustrated in FIG. 3B to expose the counterflow by maintaining the linear order of the tiles on push-back network 114 (of FIG. 1), and rearranging move-to-front network 116 (of FIG. 1) to fit the "unrolled" one-dimensional arrangement depicted. In FIG. 7B, each of tiles 0-15 is placed such that push-back network 114 traverses the tiles from top to bottom and M2F network 116 traverses the tiles from bottom to top. The topological drawing depicted in FIG. 7B provides the same connectivity as the 2D spiral cache depicted in FIG. 7A. For clarity, multiplexers are shown at the inputs of tiles 0, 3, and 4 in FIG. 7B. The multiplexers generally form part of the tiles themselves and therefore are not shown in the tile array of FIG. 7A. The move-to-front inputs to these multiplexers are conflict-free. As explained in the above-incorporated parent U.S. Patent Application "TILED STORAGE ARRAY WITH SYSTOLIC MOVE-TO-FRONT ORGANIZATION", both input signals carry the same address, due to the timeline-based organization of the systolic networks, and at most one of the data portions can be valid according to the single-copy invariant condition. The multiplexers pass the input signal having valid data, if valid data are received at one of the inputs all, into the tile. Also for clarity, spiral cache of FIG. 7A has been simplified by showing only those connections needed to communicate an address request along the diagonal paths (as exemplified by diagonal path 118 of FIG. 1) to tile 12, and from tile 12 downwards to tiles 11, 10 and 9. In the topological graph of FIG. 7B, the diagonal connections are not shown, but supply M2F requests at the move-to-front input directly connected to tiles 9, 10, 11, and 12. The modifications to FIGS. 7A and 7B do not effect the correctness of the counterflow pipeline. The distribution of M2F requests via the diagonal connections and the M2F network's vertical and horizontal, complements but does not interfere with the counterflow pipeline, even when introducing the geometric retry as described in the above-referenced parent Patent Application.

To ensure correct timing behavior, processor 100 injects new requests (M2F requests a well other special commands such as power management and cache manipulation commands) during the second clock cycle of the three-cycle systolic duty cycle, onto the diagonal M2F network path at front-most tile 0. By introducing the M2F requests at the second clock cycle, the M2F requests traverse M2F network 116 to the tile inputs and are thereby set-up to be latched at the second clock cycle. Higher dimensional spiral caches, such as the three-dimensional cache design illustrated in FIG. 9 of U.S. patent application Ser. No. 12/270,095 entitled "A SPIRAL CACHE MEMORY AND METHOD OF OPERATING A SPIRAL CACHE", the disclosure of which is incorporated herein by reference, will also avoid any interference problems if each tile is connected to the corresponding push-back and move-to-front networks such that they form a counterflow pipeline.

Network Design at the Front-Most Tile

Figure 8:
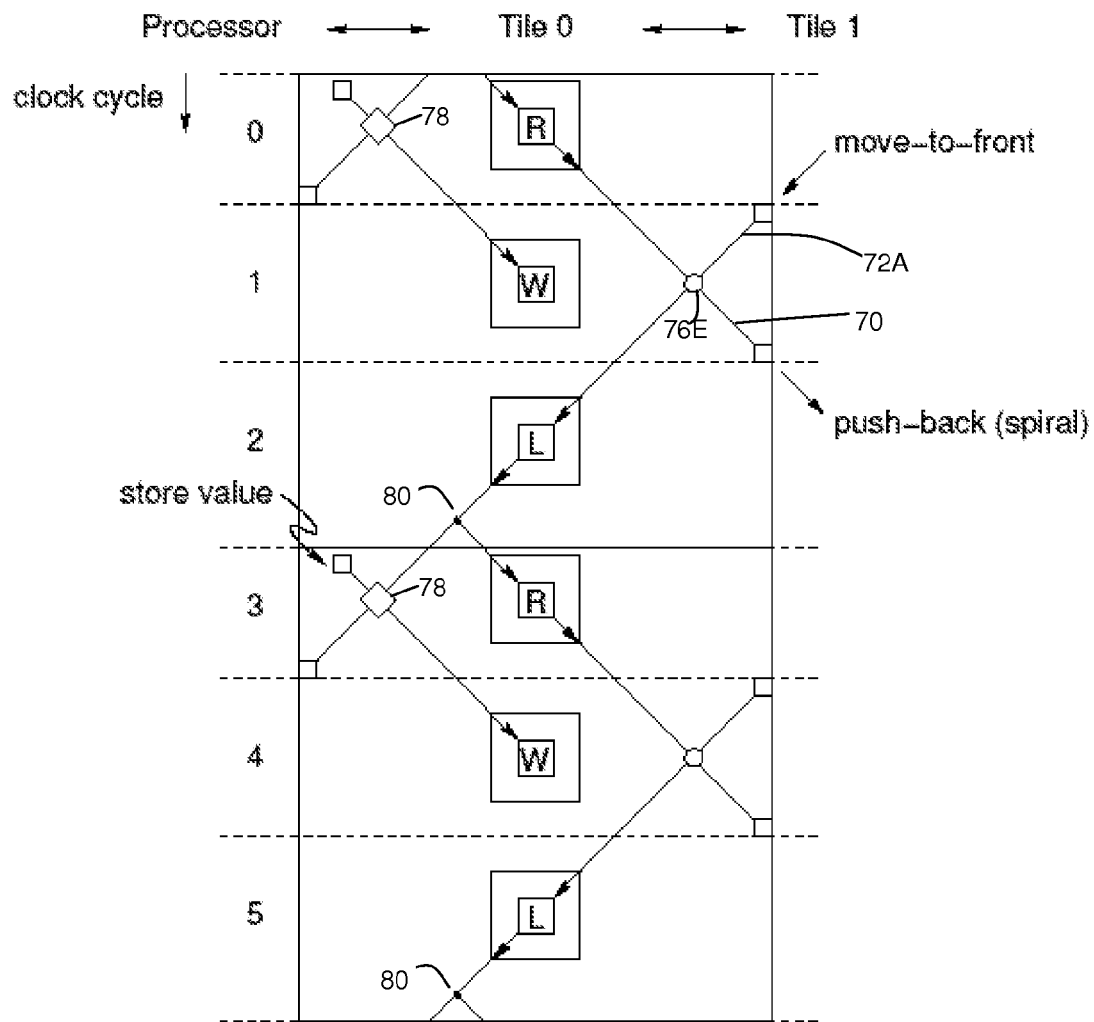
FIG. 8 is a network diagram illustrating data flow over multiple cycles at the front-most tile and lower-order interface of the spiral cache of FIG. 1.

In the above description of systolic network behavior at the tiles of a spiral cache, the description of front-most tile T0 has been postponed. At front-most tile T0, M2F network 116 and push-back network 114 interact with processor 100 in a different manner than at other tiles. Referring now to FIG. 8, operation at front-most tile T0 is illustrated over 2 systolic duty cycles and with respect to interaction with processor 100 and tile T1. An input request from M2F network 116 is received from tile T1 at the beginning of clock cycle 1, depicted by M2F dataflow 72A in clock cycle 1. An active M2F response/request either returns valid data or not. An xy-comparison is performed by comparator 76E, which may turn the push-out data from clock cycle 0 to the front. In cycle 2, if an M2F request was received with invalid data, a lookup is performed in tile 0. Otherwise, if the data is valid, the response bypasses the tile cache, avoiding the need for a the lookup operation. In contrast to the tile dataflow illustrated in FIG. 4, no xy-comparator is needed on the outgoing connection of dataflow 72A of tile T0 to move-to-front network 116 during clock cycle 2. Instead, the M2F request is replicated at split 80 and sent toward both processor 100 and the corresponding tile cache entry. In cycle 3, if the M2F response contains valid data, tile T0 performs the same read operation as other tile in support of the swap operation of push-back network 114. Additionally tile T0 performs other actions associated with completion of the processor operations that originated the M2F requests. If the request was due to a load operation, an operator 78 extracts the requested value from the cache line (i.e., the M2F response data), and passes it to processor 100. The cache line is also written to the tile cache by write operation W in clock cycle 4. If the request was due to a store operation, operator 78 patches the cache line with the store value provided by processor 100, and passes the modified cache line to the tile cache. In clock cycle 4, the cache line, potentially modified by the store patch, is written to the cache in tile T0 via write operation W, completing the M2F operation.

In summary, when a M2F response with valid data arrives at tile T0 in clock cycle 1, space is reserved in the cache of tile T0 by initiating a push-back in clock cycle 3, and writing the data into front tile T0 in clock cycle 4. If the M2F lookup in tile T0 hits during clock cycle 2, which should be the common case if the M2F heuristic provides an effective placement, and the request is associated with a load operation, then write operation W is not needed during cycle 3. Also, if the M2F request has invalid data after lookup operation L at the end of clock cycle 2, then the associated request is unsuccessful. If the request results in a miss within the nested subset specified by the retry bound, operator 78 passes the miss information to the memory interface of processor 100, where the decision must be made either to inject a new request with an incremented retry bound, or to send a load request to backing store 112 if the maximum retry bound has been reached.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A storage circuit, comprising:
multiple storage tiles for storing values;
a first information pathway for moving requests for values containing a corresponding address and responses containing the values along with their corresponding addresses between neighboring ones of the tiles to form a first at least one linear ordered path for propagation of the retrieved values and requests;
a second information pathway for moving other values and their corresponding addresses between neighboring ones of the tiles to form a second at least one linear ordered path for propagation of the other values, wherein the first information pathway and the second information pathway comprise separate information pathways connecting a front-most one of the multiple storage tiles to the other ones of the multiple storage tiles in a different order; and
a clocking control logic for clocking the movement of the requests, responses and other values between the multiple storage tiles according to patterns of the first and second information pathways and global clock cycles of the first and second information pathways.

2. The storage circuit of claim 1, further comprising a comparator for comparing the corresponding addresses of a request arriving from the first information pathway and one of the other values arriving from the second information pathway at an intersection of the first information pathway and the second information pathway.

3. The storage circuit of claim 2, wherein if the comparator determines that the corresponding address of the request and the corresponding address of the one of the other value do not match, the request continues to propagate along the first information pathway and the one of the other values continues to propagate along the second information pathway, and if the comparator determines the corresponding address of the request and the corresponding address of the one of the other value do match, the request is not further propagated along the first information pathway and the one of the other values is returned along the first information pathway as a response to the request.

4. The storage circuit of claim 3, wherein the first information pathway receives push-back ones of the other values propagated along individual tiles in sequence, and wherein the second information pathway contains multiple move-to-front values propagated toward a front-most one of the storage tiles along multiple linear ordered paths in sequence.

5. The storage circuit of claim 4, wherein the first information pathway forms a spiral path and wherein the second information pathway is formed from multiple radial paths that cross the spiral path.

6. The storage circuit of claim 1, wherein the first information pathway forms a spiral path and wherein the second information pathway is formed from multiple radial paths that cross the spiral path.

7. The storage circuit of claim 1, wherein a direction of and information contained within the requests, responses and other values is altered in conformity with a position of the requests, responses and values along the first information pathway.

8. The storage circuit of claim 7, wherein the requests contain an indication of one of a plurality of nested subsets of the tiles, and wherein the requests are propagated along the first information pathway only to the edge of the nested subset indicated by the indication.

9. The storage circuit of claim 8, wherein if a response and a particular request are received by a particular tile at the edge of the nested subset during the same global clock cycles of the first information pathway, the indication is modified by the particular tile to provide an expanded nested subset for the particular request.

10. The storage circuit of claim 1, wherein the global clock cycles of the first and second information pathways include at least three distinct clock phases of the clocking control logic, wherein in a first clock phase of the clocking control logic, the requests and responses are received from the first information pathway at the storage tiles and values stored in particular locations in the storage tiles mapped to the same addresses as other values received from the second information pathway are retrieved to form push-out values, wherein in a second clock phase of the clocking control logic, the other values received from the second information pathway are written into the particular locations in the storage tiles, wherein in a third clock phase, the push-out values are placed on the second information pathway and lookups are performed in the storage tiles to determine whether requests received on the first information pathway during the first clock cycle have addresses matching addresses of particular values stored in the storage tiles, wherein for any requests that have matching addresses, the requests are populated with the particular values.

11. The storage circuit of claim 1, wherein the global clock cycles of the first and second information pathways include at least two distinct clock phases of the clocking control logic, wherein in a first clock phase of the clocking control logic, the requests and responses are received from the first information pathway at the storage tiles and values stored in particular locations in the storage tiles mapped to the same addresses as other values received from the second information pathway are swapped with the other values to obtain previously-stored values as push-out values, wherein in a second clock phase, the push-out values are placed on the second information pathway and lookups are performed in the storage tiles to determine whether requests received on the first information pathway during the first clock cycle have addresses matching addresses of particular values stored in the storage tiles, wherein for any requests that have matching addresses, the requests are populated with the particular values.

12. A method of accessing stored values in a storage circuit, the method comprising: storing values in multiple storage tiles;
first moving requests for values containing a corresponding address and responses containing the values along with their corresponding addresses between neighboring ones of the tiles along a first information pathway that forms a first at least one linear ordered path for propagation of the retrieved values and requests;
second moving other values and their corresponding addresses between neighboring ones of the tiles along a second information pathway forming a second at least one linear ordered path for propagation of the other values, wherein the first information pathway and the second information pathway comprise separate information pathways connecting a front-most one of the multiple storage tiles to the other ones of the multiple storage tiles in a different order; and
clocking the movement of the requests, responses and other values between the multiple storage tiles according to patterns of the first and second information pathways and global clock cycles of the first and second information pathways.

13. The method of claim 12, further comprising comparing the corresponding addresses of a request arriving from the first information pathway and one of the other values arriving from the second information pathway at an intersection of the first information pathway and the second information pathway.

14. The method of claim 13, further comprising:
responsive to the comparing determining that the corresponding address of the request and the corresponding address of the one of the other value do not match, propagating the request along the first information pathway and propagating the one of the other values along the second information pathway; and
responsive to the comparing determining that the corresponding address of the request and the corresponding address of the one of the other value do match, halting propagation of the request along the first information pathway and returning the one of the other values along the first information pathway as a response to the request.

15. The method of claim 14, wherein the first moving moves push-back ones of the other values propagated along individual tiles in sequence along the first information pathway, and wherein the second moving moves multiple move-to-front values propagated toward a front-most one of the storage tiles along multiple linear ordered paths in sequence.

16. The method of claim 15, wherein the first information pathway forms a spiral path and wherein the second information pathway is formed from multiple radial paths that cross the spiral path.

17. The method of claim 12, wherein the first information pathway forms a spiral path and wherein the second information pathway is formed from multiple radial paths that cross the spiral path.

18. The method of claim 12, further comprising altering a direction of and information contained within the requests, responses and other values is altered in conformity with a position of the requests, responses and values along the first information pathway.

19. The method of claim 18, wherein the requests contain an indication of one of a plurality of nested subsets of the tiles, and wherein the first moving propagates the requests along the first information pathway only to the edge of the nested subset indicated by the indication.

20. The method of claim 19, further comprising responsive to receiving a particular request and a response at a particular tile at the edge of the nested subset during the same global clock cycles of the first information pathway, modifying the indication within the particular request to expand the nested subset for the particular request.

21. The method of claim 12, wherein the global clock cycles of the first and second information pathways include at least three distinct clock phases of the clocking control logic, wherein in a first clock phase of the clocking control logic, the requests and responses are received from the first information pathway at the storage tiles and values stored in particular locations in the storage tiles mapped to the same addresses as other values received from the second information pathway are retrieved to form push-out values, wherein in a second clock phase of the clocking control logic, the other values received from the second information pathway are written into the particular locations in the storage tiles, wherein in a third clock phase, the push-out values are placed on the second information pathway and lookups are performed in the storage tiles to determine whether requests received on the first information pathway during the first clock cycle have addresses matching addresses of particular values stored in the storage tiles, wherein for any requests that have matching addresses, the requests are populated with the particular values.

22. The method of claim 12, wherein the global clock cycles of the first and second information pathways include at least two distinct clock phases of the clocking control logic, wherein in a first clock phase of the clocking control logic, the requests and responses are received from the first information pathway at the storage tiles and values stored in particular locations in the storage tiles mapped to the same addresses as other values received from the second information pathway are swapped with the other values to obtain previously-stored values as push-out values, wherein in a second clock phase, the push-out values are placed on the second information pathway and lookups are performed in the storage tiles to determine whether requests received on the first information pathway during the first clock cycle have addresses matching addresses a particular values stored in the storage tiles, wherein for any requests that have matching addresses, the requests are populated with the particular values.

23. A spiral cache, comprising:
multiple storage tiles for storing values;
a move-to-front network for moving requests for values containing a corresponding address and responses containing the values along with their corresponding addresses between neighboring ones of the tiles to form a first at least one linear ordered path for propagation of the retrieved values to a front-most tile and requests among the multiple storage tiles;

a push-back network forming a spiral arrangement for pushing back other values and their corresponding addresses between neighboring ones of the tiles to form a second linear ordered path for propagation of the other values away from the front-most tile to make storage available for values moved along the first information pathway, wherein the move-to-front network and the push-back network comprise separate information pathways connecting a front-most one of the multiple storage tiles to the other ones of the multiple storage tiles in a different order; and a clocking control logic for clocking the movement of the requests, responses and other values between the multiple storage tiles according to patterns of the move-to-front and push-back networks and global clock cycles of the move-to-front and push-back networks.

\* \* \* \* \*